US011580565B1

United States Patent
Bradley et al.

(10) Patent No.: US 11,580,565 B1
(45) Date of Patent: Feb. 14, 2023

(54) PROGRAMMATIC MERCHANDISING SYSTEM AND METHOD FOR INCREASING IN-STORE TRANSACTION CONVERSIONS VIA HEURISTIC ADVERTISING

(71) Applicant: NewsBreak Media Networks, Inc., Knoxville, TN (US)

(72) Inventors: Robert Bradley, Knoxville, TN (US); Brian C. Nelson, Knoxville, TN (US)

(73) Assignee: NewsBreak Media Networks, Inc., Knoxville, TN (US)

( * ) Notice: Subject to any disclaimer, the term of this patent is extended or adjusted under 35 U.S.C. 154(b) by 884 days.

(21) Appl. No.: 15/782,246

(22) Filed: Oct. 12, 2017

Related U.S. Application Data

(60) Provisional application No. 62/407,711, filed on Oct. 13, 2016.

(51) Int. Cl.
*G06Q 30/02* (2012.01)
*G06Q 30/0204* (2023.01)
*G06Q 30/0242* (2023.01)
*G06Q 30/0251* (2023.01)
*G06N 20/00* (2019.01)

(52) U.S. Cl.
CPC ......... *G06Q 30/0205* (2013.01); *G06N 20/00* (2019.01); *G06Q 30/0244* (2013.01); *G06Q 30/0246* (2013.01); *G06Q 30/0259* (2013.01); *G06Q 30/0269* (2013.01)

(58) Field of Classification Search
None
See application file for complete search history.

(56) References Cited

U.S. PATENT DOCUMENTS

| | | | |
|---|---|---|---|
| 7,305,691 | B2 | 12/2007 | Cristofalo |
| 8,983,137 | B2 | 3/2015 | Hradetzky |
| 2004/0109094 | A1 | 6/2004 | Lindsay et al. |
| 2006/0229932 | A1 | 10/2006 | Zollo et al. |
| 2007/0132660 | A1 | 6/2007 | Nuttall |

(Continued)

FOREIGN PATENT DOCUMENTS

WO  WO2013057811 A1 *  2/2013  ......... G06Q 30/0266

*Primary Examiner* — Alan Torrico-Lopez
(74) *Attorney, Agent, or Firm* — Patterson Intellectual Property Law, P.C.

(57) ABSTRACT

An automated advertising scheduling and distribution process reacts to the effectiveness of sales data. A hosted platform creates location-specific playlists based on key consumer variables that impact buying behavior, and dynamically performs data analytics. Utilizing a programmatic system and machine learning algorithmic methodology, the platform gathers data from the retailer's data warehouse and automatically pulls location-by-location sales data while simultaneously collecting playback data. If sales are not being affected on the particular item that is being promoted, then the platform may be configured to replace that message with a promotional message for another product with a higher likelihood of engagement and conversion. This virtual feedback loop ensures that the platform is optimizing the most effective series of promotional messages for any given location. The content management administrator accordingly delivers relevant advertising/messages to various display screens integrated into fuel pumps, through the store, and to retailer loyalty program applications.

13 Claims, 3 Drawing Sheets

(56) References Cited

U.S. PATENT DOCUMENTS

| | | |
|---|---|---|
| 2007/0239546 A1 | 10/2007 | Blum et al. |
| 2008/0301189 A1 | 12/2008 | Petit et al. |
| 2009/0254416 A1 | 10/2009 | Nomula |
| 2011/0040611 A1 | 2/2011 | Simmons et al. |
| 2011/0282727 A1 | 11/2011 | Phan et al. |
| 2013/0151332 A1* | 6/2013 | Yan .................. G06Q 30/0243 705/14.42 |
| 2013/0191207 A1 | 7/2013 | Smallwood et al. |
| 2013/0264385 A1* | 10/2013 | Stoudt ................ G06Q 20/387 235/380 |
| 2013/0346221 A1 | 12/2013 | Pandey et al. |
| 2014/0019256 A1* | 1/2014 | Argue ................ G06Q 30/0255 705/14.65 |
| 2014/0093125 A1 | 4/2014 | Hradetzky |

* cited by examiner

PROGRAMMATIC MERCHANDISING SYSTEM AND METHOD FOR INCREASING IN-STORE TRANSACTION CONVERSIONS VIA HEURISTIC ADVERTISING

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of U.S. Provisional Patent Application No. 62/407,711, filed Oct. 13, 2016, and which is hereby incorporated by reference.

BACKGROUND OF THE INVENTION

A process as disclosed herein addresses a common problem for modern convenience stores in converting fuel-only purchasers to multi-product customers. A major problem for the convenience store industry is the number of customers who drive in, fuel up at a self-service gas pump, and then drive away. While this self-service, gas-only model is expedient and convenient for customers, it has posed a problem for convenience store owners who earn the majority of their profits on higher margin items sold inside the convenience store. Because the interaction time and space with a pump customer is limited, convenience stores find it difficult to convey marketing messages to customers to alert them to deals, products, and services in which they might be interested. In fact, a majority of convenience store customers never set foot inside the convenience store despite convenience stores spending millions of dollars on in-store improvements to incentivize walk-ins. Without being able to market higher margin, in-store sales to a majority of customers, convenience stores struggle with profitability and split energies between commodity gasoline pricing and convenience store pricing.

Many stores have attempted to incentivize walk-ins through at-pump advertising. However, a problem with traditional at-pump advertising is that there is no systematic way for convenience stores to track walk-in conversions due to the presence of advertising. Unless gas is purchased along with other products at the store counter, it is difficult to track when a customer who purchased gas then walks in to purchase a product inside. Sales tracking methodologies such as loyally programs are not always reliable, either, as programs only track purchasing behavior of opt-in customers who may exhibit different purchasing habits than non-opt-in customers. Moreover, knowing that a customer has made a purchase at the pump and then in the store is not necessarily an indicator of a conversion, as the customer may have intended to make an in-store purchase in the first place. Accordingly, convenience store owners cannot drive these customers to consider higher margin items and have a limited window of time to do so, given the quick-service nature of convenience store sales.

What is needed is a programmatic merchandising platform that enables at-pump advertising effective to convert pump customers to in-store customers, with a verification component that provides convenience stores with business intelligence reporting as to effectiveness by tracking and estimating the conversion rate from pump purchases to in-store purchases. Convenience stores can differ significantly with regard to geographic variables like location, proximity to highway, accessibility, average household income for the area, average demographic segmentation, etc. Moreover, different convenience stores are subject to variable conditions such as time, weather, and temperature, which dramatically affect sales. Accordingly, there is not a one-size-fits-all approach regarding marketing and advertising. A programmatic merchandising system that considers these static and dynamic variables, adjusts the display of advertisements to advertise the best instore product for the store given its static and variable conditions, and continuously monitors via feed-forward and feedback conditions the conversion rate of pump sales to in-store sales by direct and indirect statistical sales analysis would be beneficial to convenience store owners.

BRIEF SUMMARY OF THE INVENTION

Various embodiments are disclosed herein regarding a fully integrated merchandising solution that has the ability to manage and deliver content through a centralized, automated content management administrator. Predictive analytics software utilizes historical sales and key consumer buying variable data, like unit sales, market basket, time of day, temperature, and household income, to build contextual content management rules for each retail location. The content management administrator can then deliver discrete, relevant merchandising messages to various display screens integrated into fuel pumps, through the store, and to retailer loyalty program applications.

In accordance with one aspect of a system and method as disclosed herein, an integrated, programmatic merchandising platform for the retail industry is comprised of three components: (1) pump-top or integrated screens and in-store television monitors for display of audiovisual content; (2) a digital signage computer at each location with multi-channel output capabilities for delivering content to each monitor; and (3) a network operations center to operate and distribute playlist content across the retailer location network.

An embodiment of a software platform as disclosed herein automates the scheduling and distribution process by reacting to the effectiveness of sales data. This proprietary platform may schedule and distribute content using at least two filters. First, the platform may create location-specific playlists based on key consumer variables that impact buying behavior. These include elastic variables such as time of day, temperature, and precipitation, as well as static variables specific to the store location, such as for example location owner, location address, location brand, average household income, surrounding neighborhood demographics, and the like. Second, the platform may perform data analytics. Utilizing a programmatic system and machine learning algorithmic methodology, the analytics platform gathers data from the retailer's data warehouse and automatically pulls location-by-location sales data while simultaneously collecting playback data from the content management system. If sales are not being affected on the particular item that is being promoted, then the platform may be configured to replace that message with a promotional message for another product with a higher likelihood of engagement and conversion. This virtual feedback loop may effectively ensure that the platform is always optimizing the most effective series of promotional messages for any given location.

DETAILED DESCRIPTION OF THE INVENTION

Figure 1:
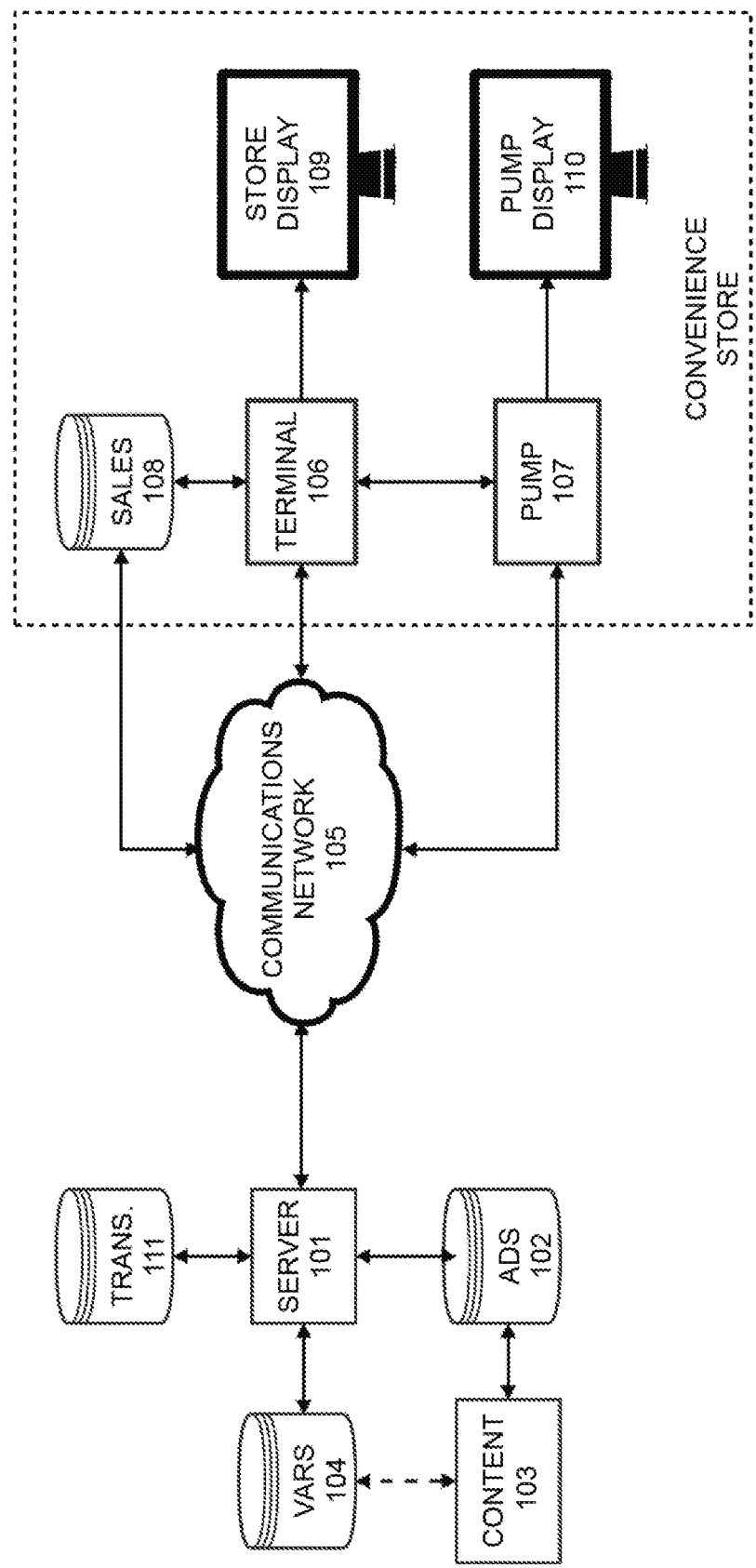
FIG. 1 is a block diagram representing an embodiment of a programmatic merchandising system as disclosed herein.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The term "communications network" as used herein with respect to data communication between two or more parties or otherwise between communications network interfaces associated with two or more parties may refer to any one of, or a combination of any two or more of, telecommunications networks (whether wired, wireless, cellular or the like), a global network such as the Internet, local networks, network links, Internet Service Providers (ISP's), and intermediate communication interfaces.

The term "key consumer variables" as used herein may refer to a plurality of sales metrics, key performance indicators, and location- and/or purchaser-specific data, associated for example with item or store sales for one or more retailers or wholesalers such as convenience stores, grocery stores, department stores and the like. Some key consumer variables may be relatively static based on store location such as location owner, location address, location brand, average household income, age differential, gender differential, proximity to interstate or highway, etc. Other key consumer variables may be dynamic and polled periodically based on date and/or time, such as time of day, temperature, precipitation, manager on duty, etc.

A system and method of an invention as disclosed herein may relate to embodiments of a programmatic merchandising system and one or more embodiments of methods thereto for increasing in-store transaction conversions via heuristic advertising.

Figure 2:
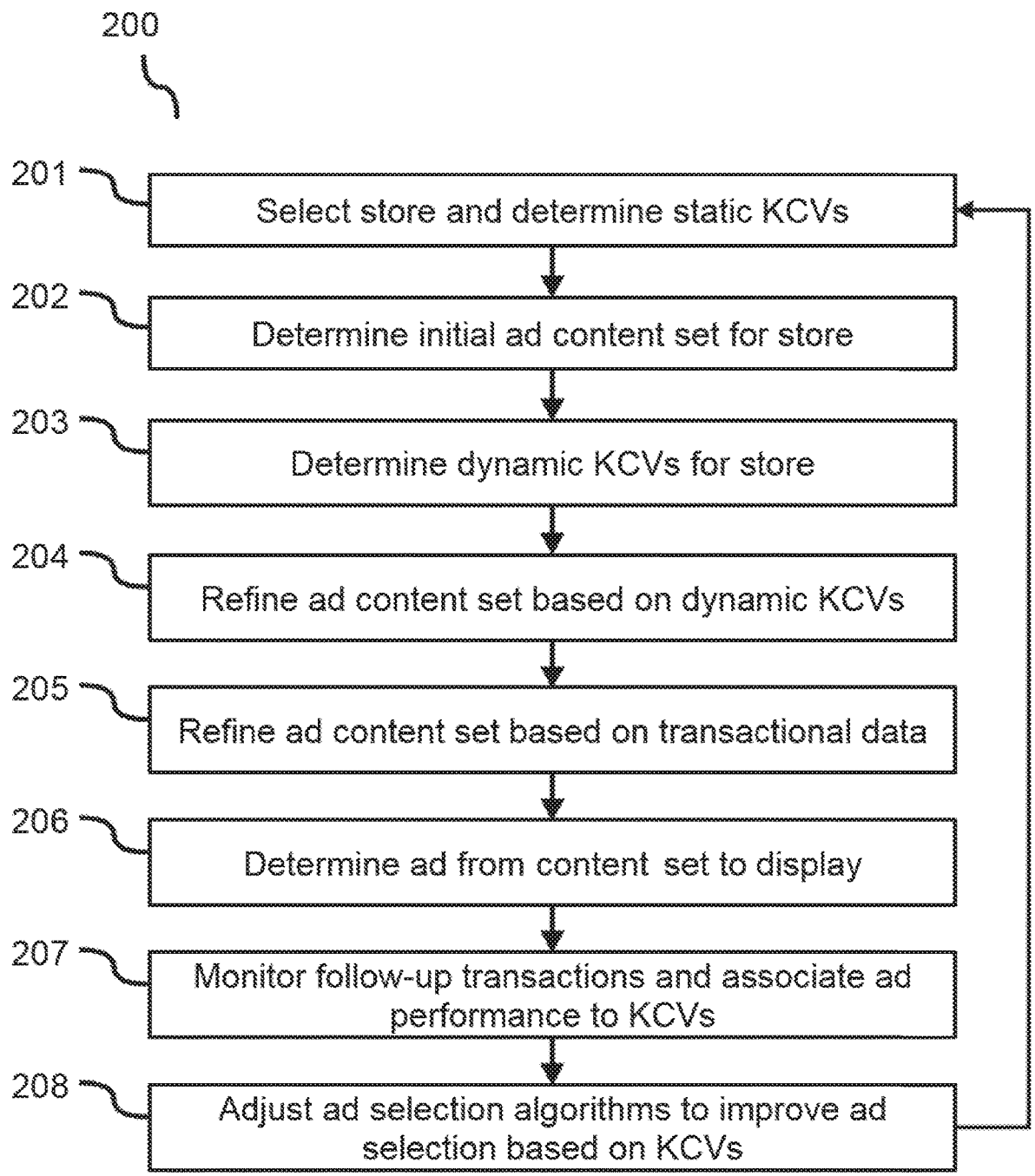
FIG. 2 is a flowchart representing various steps in at least one embodiment of a method as disclosed herein.
Figure 3:
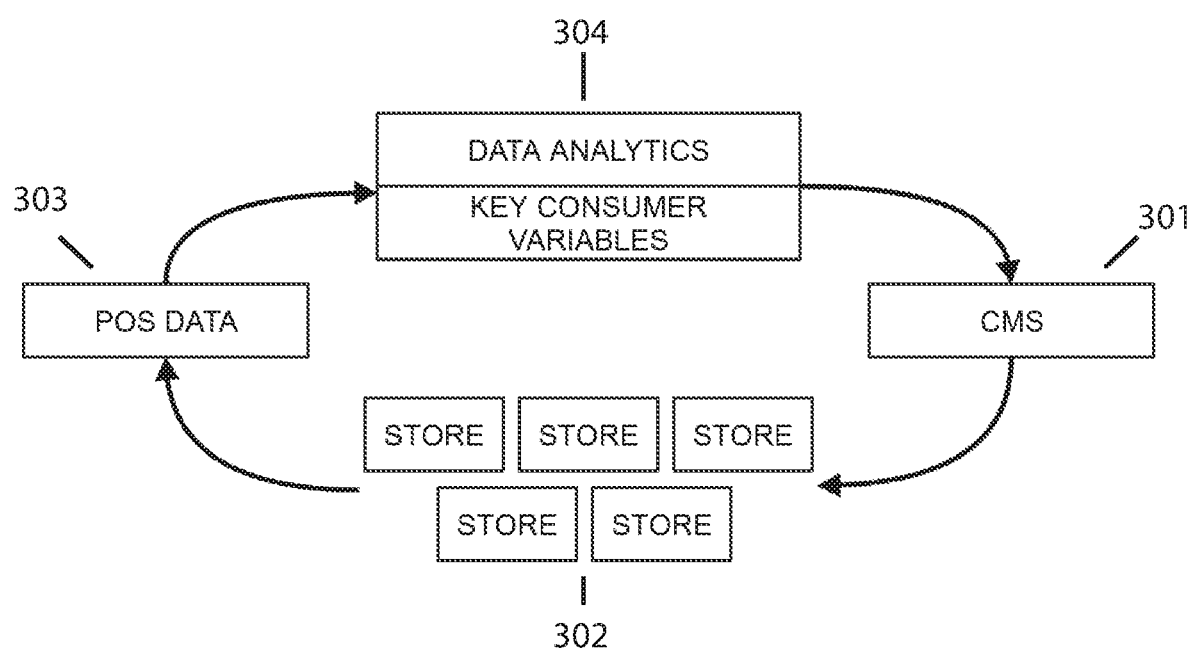
FIG. 3 is a flow diagram representing an embodiment of a programmatic merchandising method for determining conversion rates and refining advertisement placement.

Referring generally to FIGS. 1-3, various exemplary embodiments may now be described in detail for a programmatic merchandising system and one or more embodiments of methods thereto for increasing in-store transaction conversions via heuristic advertising. Where the various figures may describe embodiments sharing various common elements and features with other embodiments, similar elements and features may be given the same reference numerals, and redundant description thereof may be omitted below.

Referring first to FIG. 1, an exemplary embodiment of a programmatic merchandising system 100 as disclosed herein may include an advertising server 101 for managing and delivering advertising content. The advertising content may be stored on an advertising database 102 communicatively connected thereto. The advertising database may host a plurality of data including multimedia advertising content 103. The multimedia advertising content 103 may be associated by the server 101 with one or more specific products or services to be advertised and sold at client convenience stores. For example, the multimedia advertising content 103 may include formatted, audiovisual advertisements for videographic display advertising in-store products such as food products, drink products, automotive products, alcohol, tobacco products, and the like.

The server 101 may further be connected to a key consumer variables database 104 upon which key consumer variables are stored in association with one or more client convenience stores. Each client convenience store may be associated by the server 101 with a plurality of key consumer variables for tracking sales performance and conditions related to sales performance for each client convenience store location. In an embodiment, key consumer variables may be aggregated or grouped and further stored upon the key consumer variable database 104 in relation to a plurality of client convenience stores, such as by geographical region, by client, or by other type. For example, key consumer variables may exist for each client convenient store, for stores within a certain county, for stores within a certain state, for all stores of a certain client brand, for all independently owned stores, for all 24/7 stores, etc.

The server 101 is connected via a communications network 105 to at least one convenience store, wherein the server 101 may be communicatively connected to an in-store POS terminal 106, an on-site gas pump terminal 107, and a convenience store sales database 108, wherein sales data for the POS terminal 106 and the gas pump terminal 107 are stored. The sales database 108 may in various embodiments be stored offsite in relation to the client convenience store, to which the relation of the sales database 108 to the store terminals are logical and communicative, such as via the communications network 105. For example, a convenience store brand may store and aggregate sales data for multiple associated convenience store locations. The server 101 may be communicatively connected to this sales data via an API to extract sales data in relation to individual stores and various terminals therein. Multiple terminals are contemplated herein, wherein additional terminals function in accordance with their respective type (e.g. a pump terminal 107 or an in-store POS 106).

The server 101 may determine for a given convenience store a preliminary set of advertising content 103 to be delivered via the communications network 105 and displayed on-site. The system 101 may determine the preliminary set based on associated static key consumer variables determined from the variable database 104 including, at minimum, products sold by the client convenience store. For example, the server 101 may determine that a convenience store only sells Coca-Cola products and thereby excludes advertisements pertaining to Pepsi products; or the server 101 may determine from a preprogrammed association or from algorithms based on historical data analysis that cigarette and beer advertisements generate more sales at stores in low household income areas and, therefore, selects related advertisements. The server 101 may further refine the preliminary set and determine a subset of ads to deliver based on dynamic key consumer variables. For example, the server 101 may select advertisements for items which perform better given certain weather or time conditions: breakfast items in the morning; hot coffee on cold days; tire chains when snow is imminent; etc. The server 101 may continually redefine the set of advertisements primed to deliver based upon the changing of these dynamic key consumer variables.

In one embodiment, the server 101 may deliver a series of selected advertisements for display at the convenience store via video screens. For example, the server 101 may continuously stream or may deliver for caching and periodic playback one or more advertisements for display, such as upon an in-store display 109. The server 101 may also or alternatively deliver advertisements on demand, such as when a customer initiates a transaction at the pump terminal 107. In one embodiment, the server 101 may determine one or more advertisements to play based upon the selected set. In another embodiment, the server 101 may determine an advertisement from additional client POS data. For example, the server 101 may curate specific advertisements based on the time of the transaction, the type of fuel selected, the quality of fuel selected, the amount of fuel purchased in the transaction, the customer loyalty number entered (or lack thereof), the type of credit card, the credit card number, etc. This curation may be statically programmed, such as if the system has been programmed to select certain advertisements for customers who select premium gas or pay using an American Express card, or the curation may be dynamically determined from historical sales figures, such as if the server 101 determines that advertisements for extra-large fountain drinks perform better with customers who purchase over 25 gallons of fuel in a transaction. The server 101 may transmit the targeted advertisement for display on a pump-based display screen 110. In certain embodiments, such as when targeted curation is not possible or feasible, the server 101 may select an advertisement from the previously curated ads for display on the pump-based display screen 110.

In one embodiment, the server 101 may, in real-time or in historical review, access and analyze the sales data from the sales database 108 and determine sales trends therefrom pertaining to item sales and transactional trends. The server 101 may further heuristically aggregate transactions based upon times following advertisement display on the one or more displays 109 and 110. For example, the server 101 may identify a sale of two 24-oz. Coca-Cola products via an in-store terminal and associate that sale with a previous transaction from the pump terminal 107 wherein a video was displayed for a customer on display 110 advertised two 24-oz. Coca-Cola products for the price of one during an at-pump transaction that occurred less than 300 seconds prior. The product sale and at-pump transaction may be associatively linked via direct evidence data, e.g. the same credit card, same customer loyalty number used, or use of a coupon code via the advertisement; or via extrinsic evidence data, such as time between transactions, differential from normal product sales patterns, etc.

The server 101 may store variable data and algorithms pertaining to the sales transactions in a transaction database 111 on an ongoing basis and determine therefrom via historical pattern analysis, trend differentiation, machine learning algorithms, and other similar automated methods whether certain advertisements are effective at creating sales conversions. In an embodiment, the server 101 may analyze any direct evidence data or indirect evidence data to determine whether an advertisement was the likely or proximate cause for causing a customer to engage in purchasing behavior. For example, the server 101 may identify an upswing in food product sales and determine that 80% of said sales can be attributed to food product advertisements displayed directly to customer.

The server 101 may adjust the content selection and curation algorithms, or variables thereof, in response to determinations made as to effectiveness of advertisements over a period of time. Continuing the above example, the server 101 may significantly increase the likelihood that food product advertisements will be displayed due to the high, 80% response rate, thereby ensuring that a food product advertisement is more likely to display than a less effective advertisement. The server 101 may further make this determination on a store-by-store basis, such as where certain stores have an 80% response rate, but other stores only have an 8% response rate. In further embodiments, the server 101 may attribute differences in response rates to differences in key consumer variables and adjust the advertisement selection algorithms or variables thereof to maximize conversion for a plurality of stores based on the key consumer variables. For example, where four convenience stores have seen a 27% increase in in-store follow-up sales following display of an advertisement for energy drinks on rainy days, the system may increase the likelihood of energy drink advertisements for other stores in different geographic locations where rain is projected to occur, despite the absence of pertinent sales data for those particular stores.

In an embodiment, the server 101 may further store customer profiles in association with client loyalty programs, credit card number, or another unique identifier. In an embodiment, the server 101 may store the customer profiles in a customer profile database. The server 101 may determine advertisements that are more or less effective for a particular user in accordance with predetermined or analyzed customer metrics. Specifically, this customer profile may be maintained across multiple client convenience stores, such that advertisements deemed more likely to engage a specific customer in a product sale and convert the customer from a pump transaction to an in-store follow-up purchase will be displayed. For example, where the server 101 would normally send for display on the pump display 110 an advertisement for beer products, but the server 101 has determined a unique customer from sales data from the sales database 108 and profiled said customer as never having historically purchased a beer product, the server 101 may override the original determination for display of a beer ad and substitute an advertisement for an alternative product.

In certain embodiments, the system may further deliver advertisements to a customer mobile device, such as where a customer uses his or her mobile device for a customer loyalty program. Such an embodiment may be advantageous for uniquely identifying and tracking conversion rates. For example, an ad may display either on the user device or on a pump display 110, whereby a coupon QR code may be sent to the user's mobile device to be scanned at the store terminal 106 upon purchase of the advertised products to redeem a discount.

Referring to FIG. 2, an exemplary method 200 for increasing in-store transaction conversions via heuristic targeted advertising as disclosed herein may be described in part or in whole as follows. The method 200 may begin at a first step 201 wherein the advertising system selects a client convenience store and determines for said client convenience store one or more associated static key consumer variables. In step 202, the system determines from the static key consumer variables one or more relevant advertisements for display at the client convenience store in accordance with an advertisement selection algorithm. In an embodiment, the advertisement selection algorithm may be a machine learning algorithm based upon the static key consumer variables for the client convenience store and historical sales data demonstrating advertisement performance. For example, the system may initially determine an initial set of advertisements associated with the convenience store as directly programmed to be associated or alternatively determined in accordance with a product matrix stored one or more static key consumer variables. The advertisements may therefore be directly associated with the convenience store via user selection or via algorithmic selection.

In step 203, the system further determines one or more dynamic key consumer variables associated with the client convenience store, determined independently for said iteration. In an embodiment, the system may query one or more internal or external servers to determine dynamic key consumer variables such as weather information, time, temperature, traffic conditions, daily sales, staff on duty, and other temporally variable information for the client convenience store. This data may be aggregated from a client convenience store database where such data is tracked by the client for its various convenience stores. Alternatively, this data may be aggregated from other sources such as weather sites or first- or third-party sensors.

In step 204, the system refines the initial set of advertisements determined in step 202 based upon the dynamic key consumer variables. In various embodiments, the system may refine the initial set by making a probabilistic determination of an advertisement's likelihood of generating a sales conversion based upon its display at the client convenience store. In one embodiment thereof, the system may remove certain advertisements from the selected set where said key consumer variables do not result in a high probability of generating a sales conversion. In another embodiment, the system may prioritize advertisement based upon relative likelihoods of sales conversions with respect to the dynamic and static key consumer variables without excluding advertisements from display, and generate an array of ads therefrom. In a further embodiment, the system may determine a plurality of ads to display upon rotation in accordance with the probabilistic determination, assigning weighted time slots based upon performance. For example, for a particular client convenience store on a cloudy, cool morning with high traffic, the system may select five ads to display on rotation for a morning period, wherein the first advertisement with the highest likelihood of generating a sale is displayed for a cumulative total of one hour, the second advertisement with the second highest likelihood of generating a sale is displayed for a cumulative total of forty minutes, the third advertisement with the third highest likelihood of generating a sale is displayed for a cumulative total of fifteen minutes, and so on. The system may further or alternatively perform method 200 continuously so as to reprioritize the determinations made in this step 204 on each successive, iterative performance.

In step 205, the system may receive transactional data for a specific point of sale transaction and make further refinements to the advertisement set selected based upon the transactional data received. For example, for a consumer that initiates a point-of-sale transaction at a gas pump at the client convenience store, the system may receive from the pump POS, or from the client sales database, various information pertaining to the consumer and transaction such as: credit card type, credit card number, customer loyalty number, time of transaction, type of gas selected, quality of gas selected, quantity of gas dispensed, etc. The system may then reprioritize set of advertisements selected, eliminate certain advertisements selected, or add in additional advertisements to the selected set based upon the transactional data received. For example, the system may prioritize the display of advertisements related to lottery tickets for consumers who choose regular- or plus-grade gasoline and deprioritize said advertisements for consumer who choose premium-grade gasoline based upon preprogrammed or inferred sales data indicating that regular- and plus-grade gasoline buyers are more likely to buy lottery tickets and premium-grade gasoline buyers are less likely to buy lottery tickets. Said determinations may be made in combination with static and dynamic key consumer variables associated with the relative likelihood of lottery ticket purchases, e.g. when lottery winnings are notably high or low, and further modified for selection for display or non-display accordingly.

In step 206, the system selects from the determined set of advertisements one or more advertisements to transmit to the client convenience store and display. In an embodiment, the display may occur on a video screen at the gas pump on a per-transaction basis. In another embodiment, the display may occur continuously or periodically on a video screen inside the convenience store. In yet another embodiment, the display may occur periodically or transactionally on a consumer's mobile device, such as via a push notification or an application. The system may assign a unique display identifier to the advertisement displayed for feedback based upon subsequently determined sales data, thereby determining whether the display of a particular advertisement can be associated with a particular subsequent sale.

In step 207, the system monitors for subsequent sales transactions and determines whether sales transactions are correlated with, and expressly or impliedly caused by the display of the advertisement. For example, an advertisement displaying the use of a unique coupon code may be matched with a subsequent transaction wherein the unique coupon code is used, whereby an express association is made; alternatively, the system may determine a peak in sales for items at a client convenience store associated with one or more ads displayed, the peak relative to periods where the ads are not displayed, and infer a sales boost from the display. Monitoring may be specific and on a per-transaction basis, attempting to relate one advertisement display to one transaction, or may be general and on an aggregate sales basis, attempting to discern purchasing trends. For example, the system may determine an inside sale of a product made within a certain timeframe following the display of an advertisement at the pump has a certain likelihood of being associated with the display of the advertisement based upon the positive or negative correlation of the sale to product sale trends.

Advertisement associations need not necessarily be limited to the product being advertised. For example, the system may determine a peak in bottled beverage sales when advertisements for potato chips are displayed. In various embodiments, correlation reports may be generated on a periodic basis for end-users for strategic marketing and business intelligence purposes. For example, these data inferences may be extremely useful to product manufacturers as well as convenience store operators for determining sales patterns and effects of coupon deals, both in-store and globally.

In step 208, the system programmatically adjusts the advertisement selection algorithms based upon the determinations of step 207 to identify in future iterations of the method 200 the best-performing advertisements in association with the key consumer variables and/or transactional data. For example, where one advertisement product has historically performed better for generating sales at a certain client convenience store location, that advertisement may be more likely to be selected in future iterations based upon an increased performance score. Performance may be associated with individual client convenience stores as well as consumer variables and transactional data. For example, the system may not only determine that a particular store sells more of one item based upon certain advertisements but may further extrapolate, based on data from that store or from aggregated data of a plurality of stores sharing similar key consumer variables, an association between advertisement performance and the presence or state of certain key consumer variables. For further example, the system may determine a correlation of three specific key consumer variable states indicates a rise in likelihood of successful sales conversions and creates a logical rule whereby the presence of those three key consumer variable states (e.g. near interstate, at lunch time, temperature over 90 degrees Fahrenheit) will result in a greater likelihood that ads relating to the item advertised and sold (e.g. frozen Snicker's ice cream bar, ice creams generally, cold food products generally). Alternatively, the system may make dissociative determinations where advertisement performance has been poorly correlated (e.g. reducing the likelihood of display of coolant products where previous advertisements have not resulted in a significant uptick of identifiable conversions).

In an embodiment, the system may further identify from the transactional data a consumer and update consumer profile algorithms and/or variables thereof to programmatically determine and select for display relevant advertisements for the consumer across multiple client convenience store locations. For example, for a transaction where a consumer is known, and the system has determined a low correlation of soda purchases Accordingly, and via successive iterations of method 200, the system may progressively identify the best and worst performers of advertisements for a client convenience store relative to the various key consumer variables, both static and dynamic, and adjusted in accordance with transactional data including customer information. The system thereby provides increasingly more effective advertisements for promoting in-store transactions, either generally or in association with specifically advertised items, to the various client convenience store displays.

Referring now to FIG. 3, a flow diagram representing an embodiment of a method and process for refining analyzing advertisement performance and refining advertisement selection and curation is disclosed. A content management system ("CMS") 301 generates and curates advertisements to be displayed at client convenience stores 302 and various screens at each store location based upon data analytics and key consumer variables. The selection process is individual to each store location and, in an embodiment, to each screen display. Accordingly, each client convenience store 302 receives one or more playlists of advertisements from the CMS 301 based upon the data analytics and key consumer variables related to each store location, defining which ads should be selected for display. Sales and other data for transactions occurring at the pump and at the store counter are captured by a point of sale ("POS") data system for business intelligence and accounting purposes. The POS data 303 includes sales information pertaining to items purchased.

The platform then analyzes the POS data 303 to determine if goods and services purchased by consumers are related to the display of advertisements at each site location. For example, if one client convenience store which has received a playlist for proprietary food products sees a unique spike in proprietary food products, where other client convenience stores absent these ads do not see such a spike, then the platform may associate the increased sales with the presence of those ads. By performing data analytics 304, the system can determine which advertisements are effective at generating sales conversions and which are not. Additionally, in analyzing the POS data, the platform compares advertisement performance in association with key consumer variables specific to each store location to determine trends. If a trend is identified for positive or negative advertisement performance based on a key consumer variable condition, the platform then adjusts the algorithmic process for selecting the advertisements at the content management level. The next iteration of the CMS 301 therefore has a more refined data set to compare advertisements for selection to key consumer variables present. Accordingly, the CMS 301 upon next iteration of advertisement playlist selection and curation can more accurately identify higher performing ads for each client convenience store location, curating advertisement playlists to the key consumer variables appropriate for each store. The process continues systematically and iteratively, identifying positive and negative conversion and sales trends and optimizing advertisements to maximize sales at each store based on the key consumer variables associated therewith.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A content management system for programmatically managing and delivering advertising content, comprising:
    a hosted server linked via a communications network to one or more display units, point of sale terminals and sales databases associated with each of a plurality of client retail locations, wherein the server is linked to the sales databases via an application program interface (API) to extract sales data in relation to individual client retail locations and various terminals;
    an advertising database hosting a plurality of multimedia advertising content associated by the server with one or more specific products or services to be advertised at an exterior product terminal located at a first area of the client retail locations and sold at an interior transaction terminal located at a second area of the client retail locations, wherein the server is further linked to the one or more display units for each of the plurality of client retail locations via digital signage computers having output capabilities for delivering multimedia advertising content from the advertising database to the respective exterior product terminals;
    a key consumer variables database upon which key consumer variables are aggregated in association with respective ones of the client retail locations for tracking sales performance and conditions related to sales performance for each client retail location at least in part according to an association between one or more purchased products or services at one or more client retail locations and an advertised product or service, wherein the association between one or more purchased products or services at one or more client retail locations and the advertised product or service is configured to be in part determined by heuristically aggregating transactions based upon times following advertisement display on at least one exterior product terminal or the existence of at least one aggregated transaction with at least one sales transaction at the interior transaction terminal within a determined time period,
    wherein the server is accessible by a network operations center and configured for each client retail location to
        determine a first set of advertising content based on associated static key consumer variables determined from the key consumer variable database,
        select one or more of the first set of advertising content to be displayed on at least one display unit of a respective exterior product terminal of the client retail location based on one or more key consumer variables selected from a group comprising the static key consumer variables and dynamic key consumer variables,
        determine a second set of advertising content for subsequent display based on the associated key consumer variables and further on sales data collected from the interior transaction terminal via the communications network at the sales databases, and extracted from the sales databases via the API, with respect to transactions corresponding to previously displayed advertising content within a predetermined time period following presentation of the second set of advertising content to at least one previous consumer by the at least one display unit of the respective exterior product terminal; and
        transmit at least one set of advertisement content to the client retail location via the communications network, wherein the transmitted at least one set of advertisement content is selectively (i) transmitted in a manner to be cached at the client retail location for later playback by the at least one display unit of the respective exterior product terminal or (ii) continuously streamed on demand to the client retail location.

2. The system of claim 1, wherein the server is further configured for each client retail location to transmit the second set of advertising content to the one or more display units, and cause the transmitted advertisements to be displayed.

3. The system of claim 1, wherein the point of sale terminals includes both in-store point of sale terminals and customer activated point of sale terminals.

4. The system of claim 3, wherein the customer activated point of sale terminals are linked to one or more display unit, wherein the server is further configured for each client retail location to display transmitted advertisement on-demand to the one or more display unit is linked to a customer activated point of sale terminal and a customer initiates a transaction with the customer activated point of sale terminal.

5. The system of claim 4, wherein the server is further configured for each client retail location to curate targeted advertisements to be displayed based on additional data from the customer activated point of sale terminal.

6. The system of claim 1, wherein the server is further linked via a communications network to a central customer profile database that is maintained across multiple client retail locations, and,
    wherein the server is further configured for each client retail location to
        store customer specific information in the central customer database;
        analyze the customer specific information to develop customer specific purchasing trends;

generate customer specific advertisement sets in accordance with predetermined or analyzed customer specific information; and display the customer specific advertisement set on a display unit linked to a customer activated point of sale terminal when engaged with by a customer.

7. The system of claim 1, wherein the server is further configured for each client retail location to upload point of sale data onto the sales database, and determine sales trends pertaining to advertised and non-advertised items.

8. The system of claim 7, wherein the server is further configured for each client retail location to heuristically aggregate point of sale data based upon times following advertisement display on the one or more displays.

9. The system of claim 7, wherein the server is further configured for each client retail location to analyze direct and indirect evidence data linking a customer purchase to specific advertisements;

generating a likelihood determination based on the analyzed direct and indirect evidence; and automatically assign each advertisement a performance score with respect to creating sales conversions.

10. The system of claim 9, wherein the server is further configured for each client retail location to adjust selection of advertising content in response to each advertisement's effectiveness rating.

11. The system of claim 10, wherein the server is further configured for each client retail location to associate dynamic key consumer variable with specific advertisements and the associated effectiveness rating;

assign priority ratings to each specific advertisement; and dynamically adjust future advertisement selection, display time, and ordering based on the assigned priority ratings.

12. The system of claim 1, wherein the server is configured to aggregate a plurality of client retail stores to generate sets of advertisements based upon common key consumer variables and effectiveness ratings.

13. The content management system of claim 1, wherein at least a portion of the first and second areas of the client retail locations overlap.

* * * * *